Figure 1:
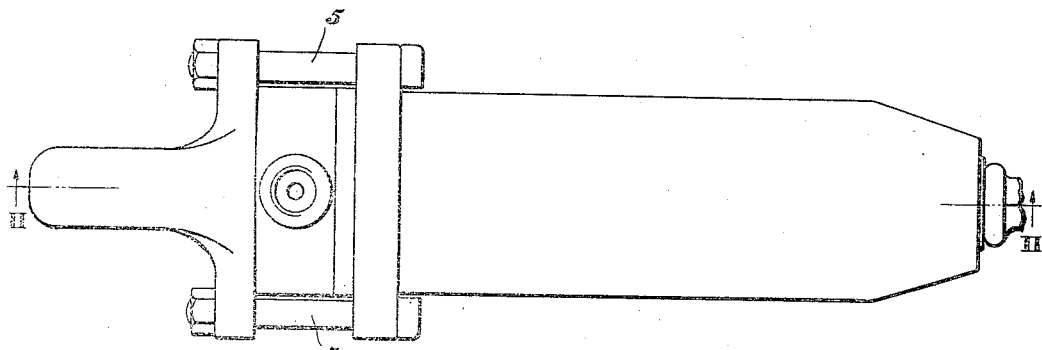

L. C. BAYLES.
VALVE FOR PERCUSSIVE TOOLS.
APPLICATION FILED MAY 31, 1912.

1,056,250. Patented Mar. 18, 1913.

WITNESSES:
Geo. W. Winslow
Russell H. Wilhelm

INVENTOR
Lewis C. Bayles
BY
Philip Burwell Goode
ATTORNEY

UNITED STATES PATENT OFFICE.

LEWIS C. BAYLES, OF EASTON, PENNSYLVANIA, ASSIGNOR TO INGERSOLL-RAND COMPANY, OF NEW YORK, N. Y., A CORPORATION OF NEW JERSEY.

VALVE FOR PERCUSSIVE TOOLS.

1,056,250.                Specification of Letters Patent.    Patented Mar. 18, 1913.

Application filed May 31, 1912.   Serial No. 700,638.

*To all whom it may concern:*

Be it known that I, LEWIS C. BAYLES, a citizen of the United States, residing in Easton, in the county of Northampton and State of Pennsylvania, have invented certain new and useful Improvements in Valves for Percussive Tools, of which the following is a specification.

This invention relates to percussive tools and more particularly to a valve for such tools.

The type of valve to which this invention relates is that wherein the valve itself consists of a cylindrical body portion to which one or more wings are attached which control the inlet to the cylinder and, at the same time serve to oscillate the valve. Such a valve is shown in my former patent, Reissue 13,317 of November 21, 1911. In these valves as heretofore used the inlet ports of the cylinder have been controlled by one wing while the exhaust ports have been controlled by a wing or wings on the opposite side of the cylindrical body. As the pressure on the inlet side of the valve is naturally considerably greater than on the exhaust side, there is an unbalanced pressure tending to force the valve toward the exhaust side of the valve chest which produces some friction and eventually wear.

The object of the present invention is to construct a valve which will operate with equal facility and efficiency and, at the same time, be perfectly balanced by opposing fluid pressures so that wear and friction are reduced to a minimum.

Figure 2:
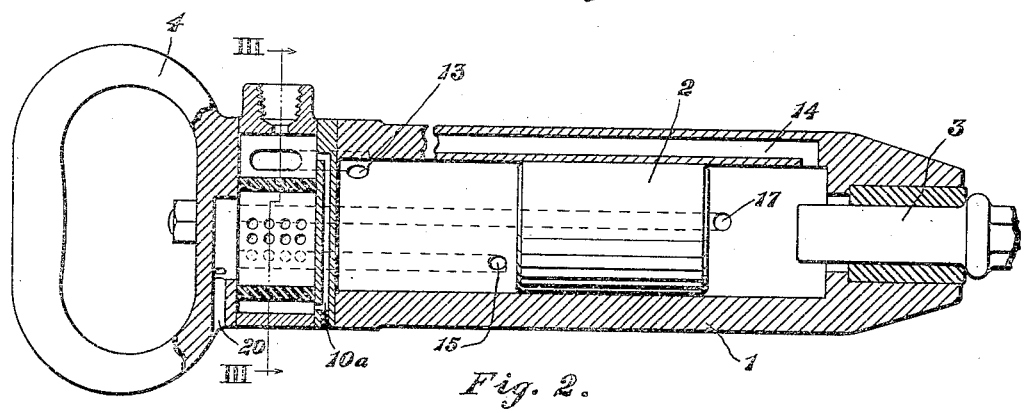
Figure 3:
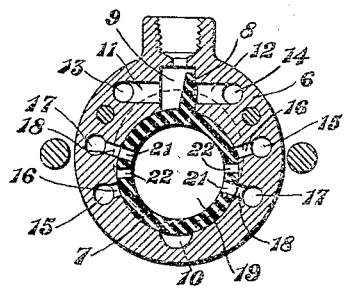

With this object in view I have devised a valve a practical embodiment of which is shown in the accompanying drawings in which:

Figure 1 is a plan of the complete tool. Fig. 2 is a longitudinal section on the line II—II of Fig. 1. Fig. 3 is a transverse section through the valve chest on the line III—III of Fig. 2 and Fig. 4 is a section similar to Fig. 3 showing a modified form of the valve.

As shown in the drawings the tool comprises a cylinder 1 in which reciprocates the piston 2 which actuates by its impact the tool piece 3. The tool is provided with the usual handle 4 secured to the cylinder by bolts 5. Between the rear end of the cylinder and the handle is a cylindrical valve chest 6. In the valve chest 6 is the valve which consists of a cylindrical body portion 7 seated in a correspondingly shaped bore in the valve chest. This cylindrical body 7 is provided with a tapered wing 8 which is adapted to oscillate from one side to the other of a slot 9 into which the operating fluid is led. On the opposite side of the valve body from the slot 9 is a chamber 10 which covers an area of the valve body equal to that exposed in the slot 9. This chamber is in constant communication with the slot 9 through the passage 10ª. In the faces of the slot 9 and so placed as to be alternately opened and closed by the faces of the wing 8 are cylinder inlet ports 11 and 12 which lead by passages 13 and 14, respectively, to the back and front end of the cylinder. From points in the cylinder nearer its center than the opening of passage 13, exhaust passages 15 lead to ports 16 which open to the face of the valve body 7 at diametrically opposite points. From the front end of the cylinder, passages 17 lead to ports 18 which also open to the face of the valve body 7 at diametrically opposite points.

In the form of the valve shown in Fig. 3 the valve body 7 is provided with a cylindrical bore 19 which communicates with the atmosphere at the port 20. This is placed in communication with the exhaust ports 16 and 18 by two series of diametrically opposite perforations 21 and 22 which are adapted to register alternately with the exhaust ports 16 and 18 as the valve oscillates from one position to the other.

Figure 4:
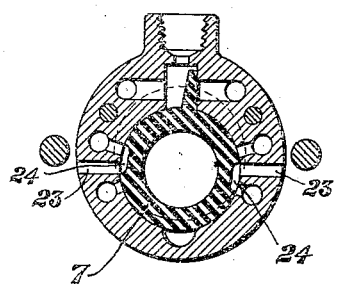

In the modification shown in Fig. 4 the valve chest is perforated by opposed passages 23 which are alternately connected with the exhaust ports 16 and 18 by recesses 24 in the face of the valve body 7.

In the operation of the tool, the piston being in the position shown in Fig. 2 and the valve being in the position shown in Fig. 3 fluid will be admitted to the back end of the cylinder through port 11 and passage 13 and will drive the piston toward the front end of the cylinder, the fluid in the forward end of the cylinder exhausting through passage 17, ports 18, 21 and 20 to the atmosphere. After the piston 2 passes the opening of passage 17 compression will be produced in the front end of the cylinder which acting through passage 14 and port 12 on the face of wing 8 will throw the valve to its other position. This will allow the operating fluid to enter the front end of the cylinder through port 12 and passage 14 and will move the piston in the other direction, exhaust passage 15 in this case being connected to the atmosphere by ports 22 being in register with ports 16.

It will be apparent that the valve as described will operate with practically no friction or wear, as the pressure on it in every direction is perfectly balanced. The pressure in the slot 9 tending to force the valve body downward is balanced by the same pressure acting on an equal area of the valve body surface in the chamber 10 while as the exhaust ports 16 and 18 are diametrically opposed there are no unbalanced pressures from the exhaust of the operating fluid.

It is to be understood that the present showing and description discloses only certain specified modifications of my invention and other forms and modifications are included in the spirit and scope of the invention as expressed in the claims.

What I claim is:

1. In a percussive tool, a cylinder, its piston, a valve comprising a body and wing, a slot in which said wing oscillates, cylinder inlet ports controlled by said wing, means for admitting live fluid to said slot, means for admitting fluid pressure to an area of said valve body to balance the fluid pressure in said slot on said valve body, and cylinder exhaust ports controlled by said valve body.

2. In a percussive tool, a cylinder, its piston, a valve comprising a cylindrical body and a wing, inlet passages controlled by said wing, and extending to the ends of said cylinder, balanced sets of exhaust passages from points nearer the middle of said cylinder than said inlet passages, extending to the face of the valve body and ports in said valve body for alternately connecting said sets of exhaust passages with the atmosphere.

3. In a percussive tool, a cylinder, its piston, a valve comprising a cylindrical body and a wing, a slot in which said wing oscillates, cylinder inlet ports controlled by said wing, means for admitting live fluid pressure to an area of said valve body to balance the fluid pressure in said slot on said valve body, and balanced cylinder exhaust ports controlled by said valve body.

4. In a percussive tool, a cylinder, its piston, a valve comprising a cylindrical body and a wing, a slot in which said wing oscillates, cylinder inlet ports controlled by said wing, means for admitting live fluid pressure to an area of said valve body to balance the fluid pressure in said slot on said valve body, balanced sets of exhaust passages from the cylinder to the face of said valve body and ports in said valve body for alternately connecting said sets of exhaust passages with the atmosphere.

5. In a percussive tool, a cylinder, its piston, a valve comprising a cylindrical body and a wing, inlet passages from the ends of the cylinder controlled by said wing, and balanced exhaust passages from points nearer the middle of said cylinder than said inlet passage, said exhaust passages being controlled by said valve.

LEWIS C. BAYLES.

Witnesses:
E. S. APGAR,
R. E. KIEFFER.